United States Patent [19]
Morris

[11] Patent Number: 5,813,017
[45] Date of Patent: *Sep. 22, 1998

[54] SYSTEM AND METHOD FOR REDUCING STORAGE REQUIREMENT IN BACKUP SUBSYSTEMS UTILIZING SEGMENTED COMPRESSION AND DIFFERENCING

[75] Inventor: Robert J. T. Morris, Los Gatos, Calif.

[73] Assignee: International Business Machines Corporation, Armonk, N.Y.

[ * ] Notice: The term of this patent shall not extend beyond the expiration date of Pat. No. 5,574,906.

[21] Appl. No.: 707,263

[22] Filed: Sep. 3, 1996

Related U.S. Application Data

[63] Continuation of Ser. No. 328,204, Oct. 24, 1994, Pat. No. 5,574,906.

[51] Int. Cl.$^6$ .................................................. G06F 17/30
[52] U.S. Cl. ........................................ 707/204; 707/203
[58] Field of Search .................................. 707/200, 202, 707/203, 204

[56] References Cited

U.S. PATENT DOCUMENTS

| | | | |
|---|---|---|---|
| 4,646,229 | 2/1987 | Boyle ...................................... | 707/203 |
| 4,686,620 | 8/1987 | Ng ............................................ | 707/10 |
| 4,809,170 | 2/1989 | Leblang et al. ......................... | 395/703 |
| 4,912,637 | 3/1990 | Sheedy et al. .......................... | 707/203 |
| 5,005,122 | 4/1991 | Griffin et al. ..................... | 395/200.33 |
| 5,089,958 | 2/1992 | Horton et al. ..................... | 395/182.03 |
| 5,133,065 | 7/1992 | Cheffetz et al. ....................... | 395/181 |
| 5,263,154 | 11/1993 | Eastridge et al. ................. | 395/182.08 |
| 5,276,860 | 1/1994 | Fortier et al. ...................... | 395/182.04 |
| 5,278,979 | 1/1994 | Foster et al. ............................ | 707/203 |
| 5,347,653 | 9/1994 | Flynn et al. ............................ | 707/203 |
| 5,418,945 | 5/1995 | Carter et al. ................................ | 707/8 |
| 5,481,722 | 1/1996 | Skinner ................................... | 395/703 |

OTHER PUBLICATIONS

T. C. Bell et al., "Text Compression", Prentice Hall, pp. 206–235, no date.

M. J. Rochkind, "The Source Code Control System", IEEE Trans. on Software Engineering, vol. SE–1, No. 4, Dec. 1975, pp. 364–370.

IBM "AIX Commands Reference", vol. 1, pp. 1–618 through 1–621.

B. O'Donovan et al., .A distributed version control system for wide area networks., Software Engineering J., 5(5), pp. 255–262. Sep. 1990.

W. F. Tichy, .RCS–A System for Version Control., Software–Practice and Experience, 15(7), pp. 737–654, Jul. 1985.

*Primary Examiner*—Thomas G. Black
*Assistant Examiner*—Jack M. Choules
*Attorney, Agent, or Firm*—Paik Saber

[57] ABSTRACT

In a client/server environment, a method and means for reducing the storage requirement in the backup subsystem and further reducing the load on the transmission bandwidth where base files are maintained on the server in a segmented compressed format. When a file is modified on the client, the file is transmitted to the server and compared with the segmented compressed base version of the file utilizing a differencing function but without decompressing the entire base file. A delta file which is the difference between the compressed base file and the modified version of the file is created and stored on a storage medium which is part of the backup subsystem. Alternatively, a copy of frequently accessed base files are maintained on the client in a compressed format. Whenever the client detects that a frequently accessed file has been modified, the modified version of the file is differenced against the base version of that file without decompressing the entire base file and a delta file is generated. The delta file is then transmitted to the server to be stored at the server for storage medium to be utilized either immediately or at a later time to update the base version of the modified file on the server.

42 Claims, 5 Drawing Sheets

SYSTEM AND METHOD FOR REDUCING STORAGE REQUIREMENT IN BACKUP SUBSYSTEMS UTILIZING SEGMENTED COMPRESSION AND DIFFERENCING

This application is a continuation of application Ser. No. 08/328,204 filed on Oct. 24, 1994, now U.S. Pat. No. 5,574,906.

CROSS-REFERENCE TO RELATED APPLICATION

U.S. patent application Ser. No. 08/328,633, now U.S. Pat. No. 5,634,052, entitled SYSTEM AND METHOD FOR REDUCING STORAGE REQUIREMENT IN BACKUP SUBSYSTEMS UTILIZING DIFFERENCING, filed Oct. 24, 1994, owned by a common assignee and having the same inventor as the present invention.

BACKGROUND OF THE INVENTION

1. Technical Field

This invention relates in general to improvements in the field of computer systems having backup/restore or archive/retrieve subsystems. More particularly, this invention relates to a method and system for reducing the storage requirements of backup subsystems in client-server environments.

2. Description of the Background Art

In a data processing system, a backup/restore subsystem, usually referred to as backup subsystem, is typically used as a means to save a recent copy or version of a file, plus some number of earlier versions of the same file, on some form of backup storage devices such as magnetic disk drives, tapes, or optical storage devices. The backup subsystem is used as a means of protecting against loss of data in a given data processing system. For example, if an on-line version of a file is destroyed or corrupted because of power failure, hardware, or software error, user error or some other type of problem, the latest version of that file which is stored in a backup subsystem can be restored and therefore the risk of loss of data is minimized. Another important use of backup subsystems is that even if failures do not occur, but files or data are deleted or changed (either accidentally or intentionally), those files or data could be restored to their earlier state thus minimizing the loss of data.

Therefore, it can readily be apparent that backup subsystems are and will remain an important part of the field of data processing.

A closely related concept to the backup subsystem is a method and system called archive/retrieve, usually referred to as an archive subsystem. Archiving refers to making copies of files on lower cost storage such as tape so that files can be deleted from more expensive technology such as disk storage. Since disk storage is frequently being updated, an archival copy also allows the state of a collection of data to be captured for later reference, even if the primary copy of the data is not going to be deleted. An example would be the archiving of a set of financial data at the end of a fiscal period. Although the improved method of carrying out the backup disclosed in this application is primarily described for a backup system, it will be obvious to the person of ordinary skill in the art of data processing that the systems and methods described herein are also applicable to archive systems or other related storage management systems.

At the present time, the majority of backup systems run on host systems located in a data processing environment. Typically, a new version (also referred to as changed version) of a file is backed-up based on a predetermined schedule such as, at the end of each day, or after each time that a file has been updated and saved.

Backup systems generally consume large amount of storage media because multiple versions of large amounts of data are being backed up on a regular basis. Therefore, those engaged in the field of data processing and especially in the field of backup/restore systems are continuously striving to find improved methods and systems to reduce the storage demand in backup systems. Current backup systems typically utilize one or both of the following methods to enable the storage of and retrieval of multiple versions of a given file. These are: (1) the full backup method and (2) the incremental backup method.

The full backup method is the most basic method used which requires the backup of an entire collection of files, or a file system, regardless of whether individual files in that collection have been updated or not. Furthermore, in the full backup method multiple full versions of each file are maintained on a storage device. Since maintaining multiple full copies of many files consumes substantial amount of storage, some type of compression technique is sometimes used to reduce the amount of data stored. Compression techniques basically rely on the presence of redundancy within the file, so called intra-file redundancy, in order to achieve this reduction. The most common method is the use of a method of file compression known as Lempel-Ziv method (also known as Adaptive Dictionary Encoder or LZ coding) described in a book by T. C. Bell et. al., titled Text Compression, pp 206–235. The essence of Lempel-Ziv coding is that phrases are replaced with a pointer to where they have occurred earlier in the text, thereby saving the storage space associated with multiple occurrence of any given phrase. This is a general method which can be applied to any file and typically results in compression ratios of the order of between 2 and 3.

Incremental backup method is an alternative to full backup used in backup systems where only those files, in any given collection of files, are backed up which have been changed since the previous incremental or full backup.

It is apparent to those skilled in the art that in any given backup system, the higher the backup frequency, the more accurately the backup copy will represent the present state of data within a file. Considering the large volume of data maintained and continuously generated in a typical data processing system, the amount of storage, time, and other resources associated with backing up data are very substantial. Thus, those skilled in the art are continuously engaged in searching for better alternatives and more storage and time efficient systems and methods for backing up data.

Aside from the compression technique which is heavily utilized to reduce storage requirement in a backup system, there exists a quite different method of achieving reduction in file size, known as delta versioning. Delta versioning has never been used in any backup system.

Delta versioning which is also referred to as "differencing" or "deltaing" relies on comparison between two files where multiple version of a file is saved in a form of a "base" file, also called a "base version" of a file, together with predetermined number of small files which represent only the changes to the base file. The small files, also referred to as "delta" files or "difference" files, contain the difference or delta from the base file. Delta files are generated as a result of comparing the base file with a later (newly arrived) or an earlier version of the base file. Thus this method of storage reduction exploits redundancy between files, or "inter-file"

redundancy, in order to achieve reduction in storage requirement. This method which is used in the software art of Source Code Control Systems, discussed in a reference below, can provide substantial storage saving in backup systems, since frequently the selection of a file for incremental backup occurs after a small change has been made to that file. Therefore, since many copies are frequently made in backup systems to files that differ only slightly from one another, the differencing method offers great potential for substantial reduction in the amount of data stored in backup subsystems.

At the present time none of the backup systems that use compression techniques utilize delta versioning. Moreover, no one has ever invented a method and system allowing the use of compression and delta versioning together in the same backup system.

Delta versioning falls into two general classes: one is where the base file is the oldest version of a file and the delta files represent newer versions. This method is referred to as "forward" deltas. The other is where the base file is the latest version of a file and the delta files represent older versions. This method is referred to as "reverse" deltas. The "reverse" delta is the more common method because usually the most utilized version of a file is the last version created.

A technical paper by M. J. Rochkind, titled "The Source Code Control System", IEEE Transaction on Software Engineering, Vol. SE-1, No. 4, December 1975, PP 364–370, teaches a software tool, known as source code control system (SCCS) which is designed to help managing changes to a source code (source program) in the field of software development tools. In SCCS environment, every time a module (file) is changed the change is stored as a discrete delta where the space required to store a delta is only slightly greater than the amount of text inserted by that delta. However, Rochkind does not teach or suggest the use of delta files in a backup and archiving subsystem in either a central or a client-server environment as a means for reducing the storage requirements of such subsystems.

U.S. Pat. No. 4,912,637 issued on Mar. 27, 1990 to C. R. Sheedy et al., teaches a system for preserving, generating, and merging various versions of the same file by a modified delta method. Sheedy teaches using an indexed line file where every line active in any version of a given file is stored, together with a variant history file where the history of the status of each line in various versions is recorded. Using these two files, any desired version of a program may be generated directly without the need for creating any of the intermediate versions. However, Sheedy does not teach or suggest the use of this modified method in backup and archiving systems in either a central processing or a client/server environment as a means for reducing the storage requirement of a backup system.

U.S. Pat. No. 5,263,154, issued on Nov. 16, 1993 to L. E. Eastridge et al., teaches a method and system for incremental backup copying of a file in a data processing system which minimizes the suspension of the data processing system during such backup copying. This is done by first physically backing up a data set on a storage subsystem on a scheduled or opportunistic basis. Thereafter, creating side-files of the data set modified. The side-files are then used in the next scheduled or opportunity to update the backed-up data set. However, Eastridge does not teach or suggest the use of delta files as a means of minimizing storage requirement in a backup and archiving subsystem in either a central processing environment or a client-server environment.

U.S. Pat. No. 5,278,979 issued on Jan. 11, 1994 to R. D. Foster, et al., teaches a method and system in the field of software code development known as Single Entity Versioning where by creating and maintaining a unique version identification and a control data file, multiple versions of source data is efficiently stored in a single entity. However, Foster does not teach or suggest the use of delta versioning or Single Entity Versioning as a means of minimizing storage requirement in a backup and archiving subsystem in either a central processing environment or a client-server environment.

Considering that the amount of the data generated on the daily basis by the computers is growing at a very fast rate, there is a need for an improved and innovative method and system to reduce the storage requirements of backup systems in central data processing systems and further in client-server environments which as will be discussed below present unique backup issues.

Backup Subsystems in a Client-Server Environment

Figure 1:
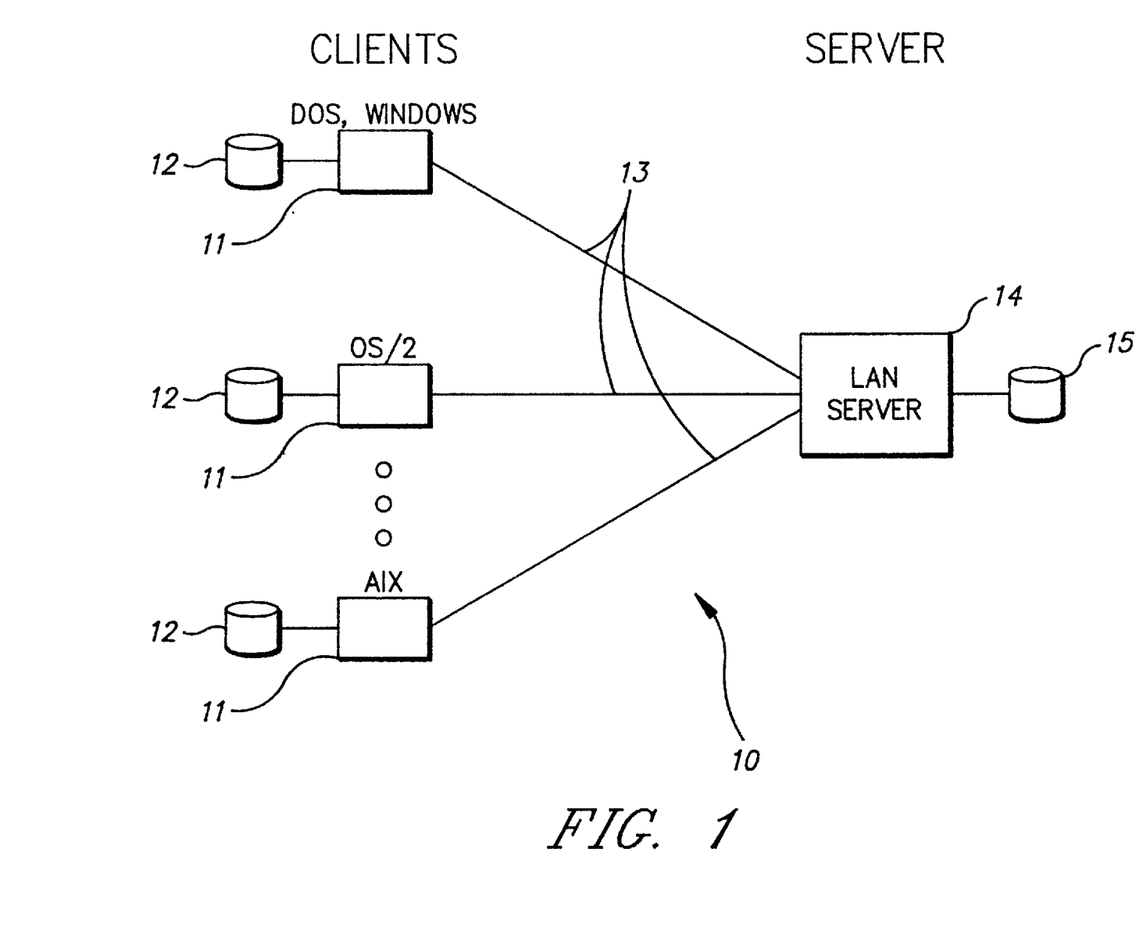
FIG. 1 is a schematic diagram of a typical client-server environment.

Recently, the emergence of low cost local area networking, personal computer, and workstation technology has promoted a new type of data processing architecture known as the "client-server" system or environment. A client-server system 10, as shown in FIG. 1, typically consists of: (1) client computers (also referred to as clients) 11 such as personal computers or workstations with their own local storage medium 12 such as disk storage devices; (2) a local area network (also referred to as LAN or network) 13 such as an Ethernet or a Token Ring which links the clients to the LAN server(s); and (3) one or more LAN server computers 14 such as a personal computer or perhaps a workstation with its own local storage mediums 15 such as disk storage devices, tape storage and/or optical storage devices.

In a client-server environment, the majority of the data processing is usually carried out at the clients which are connected by a local area or other network to a LAN server. The LAN server usually contains various programs or data which are commonly used by many of the clients. Computer users which usually use clients to carry on their data processing tasks, are generally in control of the client computers whereas the LAN server(s) is usually administered by an expert administrator of a data processing (computing) center.

The client-server environment presents a number of major issues as relates to data processing, integrity, and backup of such data. One major concern in the client-server environment is that a substantial amount of important data is located on client subsystems which lack the security, reliability or care of administration that is typically applied to the server machine(s). There is a further concern that data may accidentally be lost from a client computers, because the users of such computers do not take time and necessary care to back up the data on a regular basis. There is yet another concern that the amount of data residing on the clients are so substantial that even if a client-server backup subsystem could be developed to attempt to backup all these data, the amount of backup storage required to save all the data on the clients would be inordinate and impractical. The lack of an efficient backup system and method has been a major barrier to the adoption and rapid growth of client-server technology despite its many attractive features.

Recently a number of client-server backup systems have been developed to alleviate some of the concerns listed above. An example is an IBM's ADSM (ADSTAR Distributed Storage Manager) product. This technology overcomes some of the deficiencies mentioned above by making backup copies of the client data on a backup server. The client copies are made automatically without user involvement and are stored on storage devices which are administered by the backup server.

A typical client-server backup subsystem such as ADSM operates as follows. In the client computer a program exists, known as the client backup program, which at pre-specified or periodic times is activated and makes contact with a program residing on the backup server, known as the server backup program. After establishing contact and establishing authentication, the server backup program then consults "policy data" which instructs the server backup program as to what sort of a backup operation should occur and which files on the client computer are the subjects of the current backup. It then searches all or a subset of files on the client computer, determining which files should be backed up. For example, a data file which has changed since the backup program was last run may cause that file to be selected for the backup operation. After selecting the files to be backed up, the client backup program transmits those files, using the LAN, to the server backup program. The server backup program then makes an entry in a "backup catalog" for each file received and then stores those files on storage devices attached to the backup server.

The server backup program also carries out several other important operations. One such operation is the maintenance of its storage pools. For example, backup copies of files that were made many months ago may be moved from disk storage to tape storage in order to reduce storage costs. Another important function of the client and server backup programs occurs when the user requests the restoration of a file. The client backup program contacts the server backup program which consults its backup catalog to establish the location of the backup copy of the file. It then returns that file across the network to the client computer which in turn makes it available to the user.

Hardware which is typically needed for implementing a backup system in a client-server system includes: one or more server computers such as PC or workstations and storage mediums such as IBM 3390 magnetic storage system, IBM 3494 tape storage library or IBM 3595 optical library. These libraries which provide automated mechanical mounting and demounting of tape or optical cartridges into read/write drives and retrieve them from or replace them within the storage shelves are sometimes referred to as "jukeboxes".

Despite the recent improvements made in the field of client-server backup systems, several shortcomings have remained in all client-server backup systems including ADSM. One of the shortcomings, as mentioned earlier, is that the very large number of files on the clients now being regularly backed up tend to generate very large amounts of data resulting in large storage requirements and therefore substantially more cost in backing up data. Although systems such as ADSM compress this data on the storage devices, the amount of data remains very large. A second difficulty that is being observed is that the local area network technology is frequently unable to complete transmission of all of the changed files, even in only an incremental backup, to the backup server during the designated period for backup operations (e.g., a night shift). This is due to the bandwidth limitation of the communication network (which might include low speed remote telephony data links) and large amount of data that has to be transmitted from numerous clients to the backup server.

It is apparent now that implementation of an efficient backup subsystem in a computer processing environment is a formidable task and in a client-server environment poses significant challenges of its own. Therefore, there is a need for a new and novel backup method and system in a client-server environment that not only substantially reduces the storage requirement of backup subsystem but also minimizes the burden on the communication link between the clients and the backup server. The present invention addresses these two major deficiencies currently present in all client-server backup subsystem by providing alternative methods and systems which can be used to reduce the amount of data storage required in a client-server backup subsystem and reduces the burden on the bandwidth of the transmission network.

SUMMARY OF THE INVENTION

It is therefore an object of the present invention to provide improved backup and archiving methods and subsystems in a data processing environment.

It is a further object of the present invention to provide improved backup and archiving methods and subsystems in a client-server environment.

It is a further object of the present invention to reduce network transmission cost in a client-server environment.

It is another object of the present invention to reduce data processing loads on a backup server in a client-server environment.

It is another object of the present invention to reduce the transmission bandwidth requirement in a client-server environment.

It is another object of this invention to provide a method and system for combining compression and differencing so that both intra-file and inter-file compression can be exploited together in a backup subsystem.

It is yet a further object of the present invention to provide a method and system for combining the difference method with compression methods in a client-server subsystem, thereby reducing the network transmission cost.

It is another object of the present invention to provide a method for combining the difference method with compression methods in a client-server subsystem, thereby reducing the storage requirement in the backup subsystem of a client-server system.

It is another object of the present invention to provide a method for combining the difference method with segmented compression methods in a client-server subsystem, thereby reducing the storage requirement in the backup subsystem of a client-server system.

The foregoing objects are achieved by the invention disclosed herein. Briefly stated, in one embodiment of the invention, a file, called the "new" file (also referred to as new version of the base file or changed version of the base file), is recognized to have been changed at the client, and is then transmitted to the backup server (referred to as server). At the server the new file is differenced against the previous latest version of the file, called the "previous" file (also referred to as "base" file) which is in the compressed form to produce a file referred to as new delta. That is, the differencing is carried out on the compressed version of the base file and the changed version of the base file without decompressing the entire base file. This new delta can simply be stored along with the "new" file or the "base" file depending on whether reverse or forward delta versioning is used, respectively. Based on controlling policy management, if a fixed limit on the number of delta files is enforced, then the oldest delta is deleted.

In another embodiment of the present invention, in a client-server environment, the differencing is carried out on the compressed version of the base file and the changed version of the base file without decompressing the entire base file by the client rather than the server. However, in order for the client to carry out the differencing operation, it needs to keep a copy of the base file at the client. When the base file is modified on the client, then a new delta file is created by the client and transmitted to the server. The server may simply save the new delta and then use it at a later time to modify the compressed base file in the backup subsystem, or may apply it immediately against the base file to create a copy of the new file.

Alternatively, instead of storing a copy of the compressed base file at the client for the purpose of differencing, the compressed base file may simply be transmitted to a client whenever the client needs to modify the base file. Once the compressed base file is modified on the client, a new delta file is created and transmitted back to the server to be used and stored by backup subsystem. Note that by carrying out the differencing at the client rather than the server, the size of the file that has to be sent back to the server is substantially reduced, thereby substantially reducing the burden on the transmission network.

By using differencing and segmented compression substantial reduction in storage requirement, network transmission bandwidth, and CPU efforts expended on compression/decompression of the base file can be achieved. The use of differencing method and compression can be carried out together either at clients or server or at both the clients and the server.

In the past, the use of compression and differencing together on the same file was considered not possible since small change to a file could result in large changes to the compressed version of the file. This is because a change of one byte in a file can cause arbitrary changes in the remainder of the compressed file. Thus, if two files differ in the middle by only one character, the second half of compressed version of each file could turn out to be totally dissimilar. Furthermore, such a difference could result in an arbitrary change in the length of compressed file. Because of this problem, compression and differencing has never been used together in any backup or storage subsystem. However, this problem, according to the invention presented here, is solved by compressing the base file into multiple segments.

According to this embodiment of the present invention, the base file is compressed into multiple segments. A new file which is detected is also compressed, and as is being compressed, the base file and the newly compressed file are then compared without decompressing. As soon as a difference between the two files is detected, the appropriate segment of the base file is decompressed and compared with the corresponding uncompressed portion of the new file so a delta file can be generated. When the comparison between the appropriate segments are completed, if the differencing method is "back in synch" (i.e., in the state of not detecting any more differences), then the comparison of the compressed version of the base file and the new file is continued. If the differencing method is not back in synch at the end of the segments under comparison, comparison of the uncompressed segments of data in the base file and the new file is continued possibly to the end of the files.

The innovative embodiment stated in the previous paragraph is applicable in computing the deltas when differencing is carried out either at the server or client or both. Furthermore, this embodiment teaches a novel method and system to use both segmented compression and differencing together in a backup and archiving system. This is a significant breakthrough in the art of backup systems since current backup systems such as ADSM only make use of file compression but have not been able to implement a method that uses compression and differencing together.

It should be noted that whereas compression typically results in a space saving factor of two or three, the space saving when utilizing differencing can be much larger. For example, if n versions of a file are saved and they contain only small differences (e.g., a few lines are changed or appended in each file), then the space saving factor can approach n.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best mode presently contemplated for carrying out the invention. This description and the number of alternative embodiments shown are made for the purpose of illustrating the general principle of the present invention and is not meant to limit the inventive concepts claimed herein.

Figure 2:
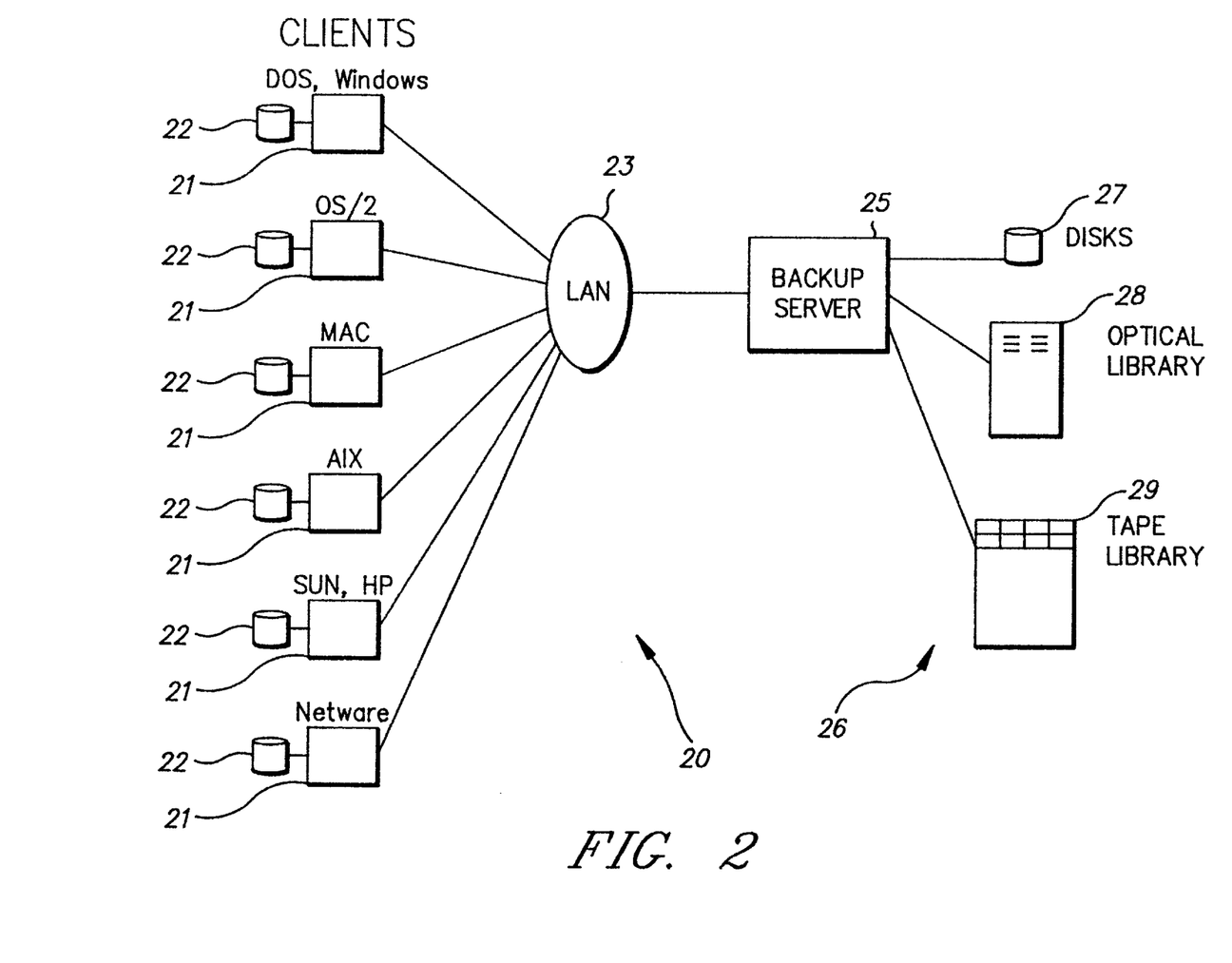
FIG. 2 is a schematic diagram of a client-server environment having a backup subsystem.

With reference now to FIG. 2, there is shown a client-server system 20 having a backup subsystem. System 20 typically includes a plurality of client computers 21 with their own local storage medium 22 such as disk storage devices. The client computers (clients) 21 may typically be personal computers of the type having a system unit (not shown) which includes CPU (processor), I/O control, and semiconductor and magnetic memories and DOS, OS/2, or Apple Macintosh operating systems. The client computers 21 may further be workstations of the type having AIX, UNIX or equivalent operating systems. These operating systems are well known to those skilled in the art of data processing and need no further description.

Still referring to FIG. 2, the client-server system 20 further includes a local area network (LAN) 23 such as Ethernet or a Token Ring which provides the communication link between the clients 21 to the backup server(s) 25.

Backup server computer 25 may typically be a personal computer of the type having a system unit (not shown) which includes CPU (processor), I/O control, and semiconductor and magnetic memories and DOS, OS/2 or Apple Macintosh operating system. It may also be a workstation having a system unit and UNIX or AIX or equivalent operating system. It may also be a large system running the AS/400, VM or MVS operating systems. Computer 25 further has its own local storage mediums 26 such as disk storage devices 27, optical library (storage) devices 28, or tape library (storage) devices 29. In a client-server system 20 shown in FIG. 2, backup system usually resides at the backup server 25. A typical backup system that resides at the server is IBM Advanced Distributed Storage Manager (ADSM) which has been explained in detail in the background section of this application. The operation and physical implementation of personal computers, workstations, disk storage devices, optical library, tape library and their constituents are well known to those skilled in the art of data processing and requires no further description.

General Notation

We now state a general notation for describing "base file" and "delta file" storage which will be applicable to all the embodiments described herein.

We will assume that a versioned sequence of files which are stored can be represented in the general form:

$$[d\_1, d\_2, \ldots, d\_n, F, d\_{n+1}, \ldots, d\_m],$$

where F is a base file and the files:

$$(d\_1, d\_2, \ldots, d\_m)$$

represent delta files, with d_1 representing the most recent delta and d_m representing the least recent delta associated with the base file F. The deltas d_1, ..., d_n can be thought of as forward deltas since they can be applied to F to generate a more recent version of the file than F, whereas the deltas d_n+1, ..., d_m can be thought of as backward deltas since they can be applied to file F to generate an older version of the file than F.

In the case that the base file in a versioned sequence is the latest file stored in the backup subsystem, such versioned sequence may be represented by:

$$[F, d\_1, d\_2, \ldots, d\_m]$$

Note that in this notation upper case letters denote base files, and lower case letters denote delta files. Delta files represent changes to the base file, and may be applied to a base file using the transformation R ("roll forward" or "roll backwards") and the differencing transformation diff(,).

We define the pair of operations diff(,) and R(,) as follows:

$$\text{diff}(A,B)=d$$

$$R(d,A)=B.$$

Thus the sequence:

$$[d\_1, d\_2, \ldots, d\_n, F, d\_{n+1}, \ldots, d\_m]$$

can be "rolled forward" to result in:

$$[d\_1, d\_2, \ldots, d\_{n-1}, G, e, d\_{n+1}, \ldots, d\_m]$$

using the operations:

$$G=R(d\_n,F)$$

and $$e=\text{diff}(G,F);$$

or "rolled backwards" to result in:

$$[d\_1, d\_2, \ldots, d\_n, e, G, d\_{n+2}, \ldots, d\_m]$$

using the operations:

$$G=R(d\_{n+1},F)$$

and $$e=\text{diff}(G,F).$$

Thus, any file in a versioned sequence from the most recent to the least recent may be produced at will using these operations. These operations are carried out at the backup server 25 using the server 25 CPU.

This method of managing versioned sequences of files is known in the art and may be found in many Source Code Control Systems application. For example, it is illustrated in IBM AIX Version 3.2 Command Reference, pages 1–618 through 1–621, a copy of which is enclosed, that given two UNIX text files called FileA and FileB the UNIX command:

diff -e FileA FileB>delta, which is carried out using a processor of a computer, produces a file called delta containing the differences between FileA and FileB. The command option '-e' causes the delta file to be in a form suitable for use with the 'ed' editor. FileB can then be reconstructed from FileA and delta using the UNIX command:

(cat delta; echo '1,$p')|ed-FileA>FileB.

This method can easily be extended to allow any previous version of the base file to be reconstructed from a chain of delta files. If the changes to the base file are small, and the n most recent version of the base file are kept, this method will reduce the storage requirement by a factor of almost n. This is a substantial improvement over LZ coding which reduces the storage requirement, in general, only by a factor of 2 or 3.

Having established the general notation, we can now describe the best mode contemplated in carrying this invention in a client-server environment having a backup subsystem.

It should be noted that the detailed embodiments are illustrated here by providing pseudo code and flowcharts for the treatment of text files, i.e., ASCII files containing "new line" characters. This will allow us to illustrate embodiments using the standard and well known UNIX text file commands of diff, cat, ed, etc. However, it will be clear to one skilled in the art that the present invention apply equally well to files which are not text files, and that exactly the same methods are applicable.

Figure 3A:
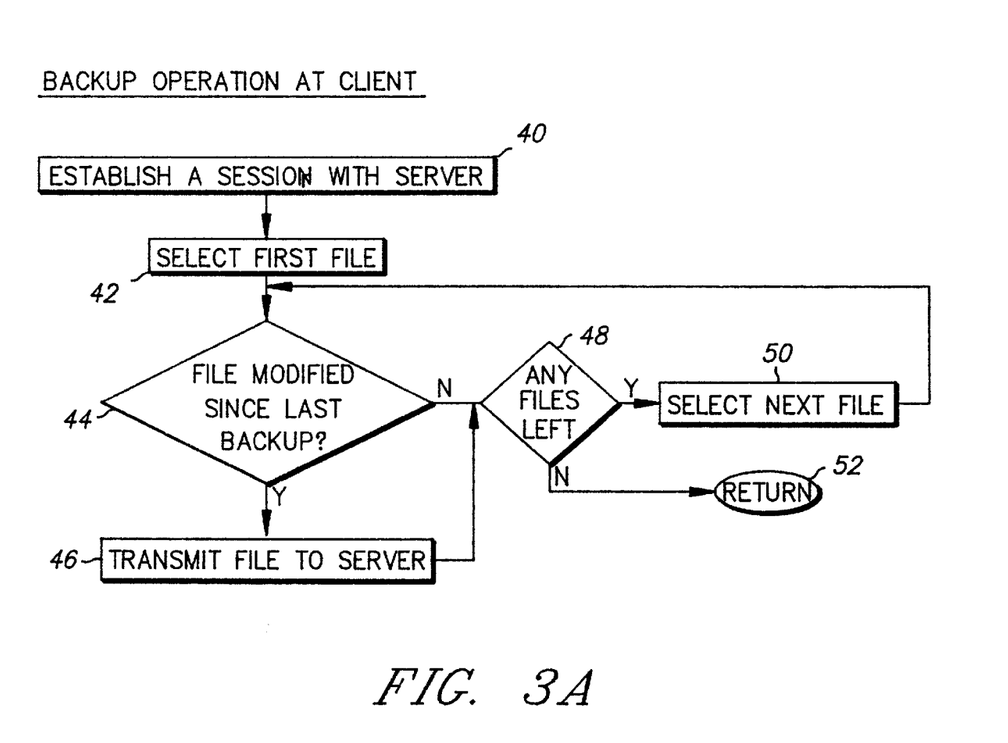
FIG. 3A is a flow chart illustrating the backup operation at the client of the preferred embodiment of the present invention.
Figure 3B:
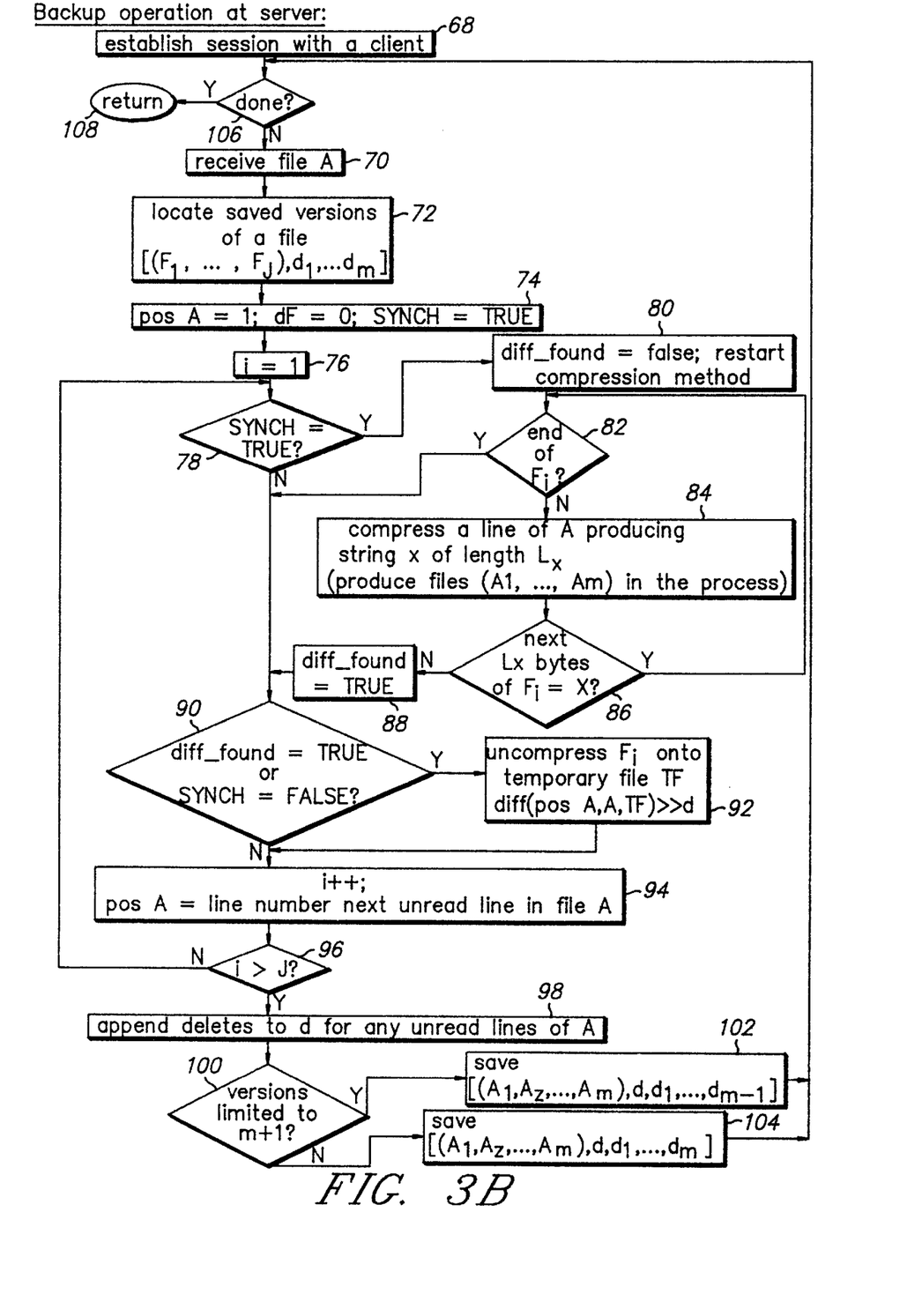
FIG. 3B is a flow chart illustrating the backup operation at the server of the preferred embodiment of the present invention.

With reference now to FIGS. 3A and 3B together, there is shown a high level logic flow chart which illustrates the differencing at the server 25 with segmented compression in accordance with the method and system of the present invention.

With reference now to FIGS. 2, 3A and 3B, this method proceeds as follows:

The client backup program, residing at the client 21, establishes a backup session with the backup server 25 by contacting the server backup program as depicted by block 40. Concurrently the server backup program establishes a session with the client 21 as depicted by block 68. Thereafter, the process passes to block 42 which depicts the selection of the first file, by the client backup program, at the client 21 for examination. Next, as depicted by block 44, the file is examined to find out if it has been modified since last backup. If the file has been modified since last backup, it is then transmitted to the server 25, using the communication link 23 which connects the client computer 21 to the server 25, as depicted by block 46. If the file has not been modified since last backup, the client backup program determines if any file is left on the client 21 that has not been checked as depicted by block 48. If any file is left the client backup program selects the next file (block 50) and examines it to determine if it has been modified since last backup (block 44). If no file is left, then the backup session is terminated as depicted by block 52.

Still referring to FIGS. 2, 3A and 3B, assuming that the client 21 has detected a changed file A according to the method described in the previous paragraph, and a communication session has been established between the client 21 and the server 25 (as depicted by block 53), file A is then transmitted in uncompressed version to the server 25, using the communication link 23 which connect the client computer 21 to the server 25.

The server 25 receives the file A as depicted by block 70, consults the backup catalog, and locates the versioned sequence:

$$[F, d\_1, \ldots, d\_m]$$

on its local storage mediums 26 as depicted by block 72, where F is the base file stored compressed in arbitrarily sized segments denoted by:

$$(F\_1, \ldots, F\_J),$$

$(d\_1, \ldots, d\_m)$ are delta files, and the versioned sequence represents m+1 versions of the base file A.

The file F is compressed into segments $(F\_1, \ldots, F\_J)$, using the backup server in conjunction with a compression program, in the following way. First, uncompressed version of the file F is divided into arbitrary uncompressed segments. The arbitrary uncompressed segments consist of whole lines in the case of text files. Second, arbitrary uncompressed segments are compressed to generate a compressed version of the file F. The following guidelines can be used to choose the size of the segments: a segment should not be so small that the method of compression loses efficiency and should not be so large that a small change causes a large amount of decompression in the algorithm below. A reasonable sizing of an uncompressed segment would be 64 KB. Assuming that 64 KB sizing of uncompressed segments is utilized by the compression program, the compression program starts the compression of a new segment whenever the compression of the next byte, or string of bytes, would exceed the 64 KB limit in the present segment.

Next, using the server processor, the incoming file A is compared with the base file F without decompressing all the segments of F as depicted by blocks 74 through 96. This is done by compressing A (according to the same compression procedure using the same dictionary as file F) one line at a time as depicted by block 84 and doing a binary comparison of the resulting compressed data of file A with the current segment of $F=(F\_1, \ldots, F\_J)$ of base file F as depicted by block 86. Note that the compression program for file A will need to be restarted each time a new segment of F is begun. For a compression method which has learned a dictionary from previous text, this dictionary is flushed, forcing its recreation. As soon as a difference is detected between the compressed line of file A and corresponding data in F, i.e., in F__i as depicted by block 86, the server backup program goes back to the point (or the line in the case of text files) in file A corresponding to the beginning of the segment F__i, decompresses the segment F__i as depicted by block 92, and proceeds to compare the corresponding uncompressed portion of files A and F__i. In the event that at the end of the segment F__i the differencing procedure is "back in synch" (i.e., in the state of not detecting differences) as depicted by block 78, then the backup program continues comparing compressed data from A and F__i+1; if at the end of segment F__i+1 the differencing procedure is not "back in synch" as depicted by block 78, then the backup program decompresses the segment F__i+1, and continues comparing uncompressed portions of A and F__i+1. This process is repeated until an end of segment in F is encountered in which the differencing procedure is "back in synch", otherwise the backup program continues to decompress segments of F and to compare uncompressed files A and F until the last segment of F, denoted F__J, has been processed in this way.

Once the comparison is completed, the incoming file A becomes the new base file replacing the previous base file F. The new base file A has segments:

$$(A\_1, A\_2, \ldots, A\_M).$$

Note that some of the segments $A\_1, \ldots, A\_M$ are obtained by step 84, and correspond with earlier segments of $F\_1, \ldots, F\_J$. However, where the files A and F are compared uncompressed (i.e., step 92) these compressed segments are generated separately. In the simplest embodiment M=J. However, certain optimizations will be evident to one skilled in the art. For example, if a large amount of data is added to a file, a segment A__K could become excessively large, therefore decreasing the efficiency at the next application of the algorithm. In that case, during the generation of A__K, the compression algorithm can be restarted to create multiple files, in which case M>J.

Furthermore, as a result of comparing files A and F, a new delta d is generated and older deltas may be discarded based on the existing deletion rule in the backup subsystem.

Next, as depicted by block 100, a decision is made as to the number of versions that may be retained for this file. Thus the state of the versioned sequence on the server 25 changes from:

$$[(F\_1, \ldots, F\_J), d\_1, d\_2, \ldots, d\_m]$$

to $$[(A\_1, A\_2, \ldots, A\_M), d, d\_1, d\_2, \ldots, d\_m]$$

if there is no m+1 version limitation for this file as depicted by block 104. Otherwise, if the server policy management of parameters requires that only m+1 versions be retained for this file, the last delta d__m would be deleted, or "expired", resulting in the representation:

$$[(A\_1, A\_2, \ldots, A\_M), d, d\_1, \ldots, d\_{m-1}]$$

as depicted by block 102.

This procedure is repeated, as depicted by block 106, until all the files which have been received from the client 21 are backed up. Once all the files are backed up, the backup operation terminates as depicted by block 108.

This method of segment comparison is further described more precisely in the pseudo code listed below which uses the structure of the C programming language but embeds English descriptions. The pseudo code is depicted by blocks 74 through 96 on the flow chart of FIG. 3B. A is the newly arriving file, and $F\_1, F\_2, \ldots, F\_J$ are the existing compressed segments of the last existing base file F at the server. We assume the existence of the differencing operation called diff(,) as defined above which reads from files A and F and maintains a global state variable SYNCH which is true if and only if the last two lines read in each file are identical, i.e., the differencing scheme is currently "in synch." A typical simple differencing program is described in Appendix A.

```
posA=1; dF=0; SYNCH = TRUE;
for i = 1 to J
    {if (SYNCH == TRUE)
        {diff_found = FALSE; restart compression method;
        do until end of Fi
            {compress a line of A producing string x of
            length Lx;
              compare next Lx bytes of Fi and x;
              if different {diff_found = TRUE; break;}
            }
        }
    if (diff_found == TRUE or SYNCH == FALSE)
            {uncompress Fi onto temp file TF;
            diff(posA, A, TF) >> d;
            /* diff(,,) sets SYNCH, dF, and appends
              its output to file d */, see Appendix A
*/
            }
    posA= line number of next unread line in file A;
    }
``` issue deletes for any remaining lines of A, /*e.g. call del(A,posA), see Appendix A */

In this program posA keeps track of the line position of the first line in A corresponding to the first line in the segment of F currently being processed. A global variable dF is also used to keep track of the number of lines by which file F has been increased (or decreased if negative) so far.

In an alternative embodiment the compression (intra-file) effort is shifted to the client 21 as opposed to the server 25 which results in substantial saving of network bandwidth. In this embodiment, the client 21 compresses the changed version of the file F known as file A and then transmits the compressed file A in segments to the server 25, one segment at a time. By sending file A compressed to the server 25 rather than the uncompressed complete file, the transmission load is reduced, typically by a factor of 2–3. This method requires the client 21 to use the same segmentation of files A and F, since otherwise the client does not know where to restart the compression process corresponding to the beginning of a new segment of F. This is most simply achieved by having the server 25 maintain a sidefile containing the line-numbers corresponding to the beginning of each segment of F. This sidefile is then transmitted to the client 21 in advance of the transmission of A, and the client 21 then uses this sidefile to restart compression.

Substantial reductions in network load are achievable by transmitting only deltas across the network to files, rather than the whole changed files. This method and system provides a major advantage for all backup systems including those backup systems operating over dial-up or narrow band transmission lines where bandwidth is extremely scarce and valuable.

In another alternative embodiment both intra-file and inter-file redundancy is utilized together at both the client 21 and the server 25 in accordance with the method and system of the present invention. This method which exploits both intra-file and inter-file redundancy at both client 21 and the server 25 requires the decompression and recompression of the file at the server 25 in its entirety. However, the cost of this activity is amortized over several versions of the file, in light of the deferred application of the deltas at the server 25. That is, instead of decompressing and recompressing the base file at the server 25 every time a delta is received, the backup programs waits until several deltas are received and then updates the base file according to the deltas received at one time.

This method proceeds as follows: the client 21 keeps a copy of the base file F from the last time it was backed up (for some subset of the files as described above)—this copy of the base file F is labelled copy F'. The copy F' is preferably kept in a cache (typically on disk storage) reserved for a subset of previously backed up files. The file F' is stored compressed in segments denoted:

$$(F'\_1, \ldots, F'\_J).$$

A changed version of the file F, denoted A, is found by the client 21. If the copy F' of the file F previous backed up version is found, the client 21 computes:

$$d=diff(F',A),$$

and sends d, the delta file, to the server 25 with file A replacing file F' at the client 21. d is computed without decompressing the entire file F' according to the method described in the pseudo code in the preferred embodiment of this invention.

At the server 25, the base file versioned sequence is stored as:

$$[d\_1, d\_2, \ldots, d\_n, F, d\_n+1, \ldots, d\_m]$$

where F is a compressed file. The server 25 updates this version history to:

$$[d, d\_1, d\_2, \ldots, d\_n, F, d\_n+1, \ldots, d\_m]$$

or possibly:

$$[d, d\_1, d\_2, \ldots, d\_n, F, d\_n+1, \ldots, d\_m-1],$$

if expiry is dictated according to the policy management on parameter expiration. Note that the bulky file in this history is F, and F may have migrated to tertiary storage.

At some convenient time (e.g, at low load periods, or when the removable storage containing F happens to be mounted) then file F can be decompressed, the file history can be "rolled forward" resulting in:

$$[A', d\_1, \ldots, d\_m].$$

A' can then be compressed in its entirety to reduce storage requirement.

If the client 21 needs to restore file A, it first checks to see whether it is found in the cache of step 1. If not, it requests a copy from the server 25, and the server 25 immediately locates and returns the file history. If the roll forward operation has occurred, A' is immediately returned to the client 21. (It is transmitted compressed and decompressed at the client). If not, roll forward operation is carried out.

This alternative embodiment significantly reduces the transmission load by transmitting only a delta version of the file across the network. The cost is that a copy of some subset of base files, according to a certain qualification criteria, must be maintained at the client. This is a tradeoff between storage space and transmission speed and burden which may be profitably exercised if network bandwidth is scarce, as is often the case, particularly in the case of dial-up or narrow band backup service.

Note that only the most previously backed up version of the file (and not any older versions) needs to be saved at the client 21 if this savings is to result. However, it is found that files that change one day are quite likely to change the next day or at a time in the near future. This phenomenon is known as "temporal locality of access" and is well known in the art. Thus we can maintain a subset of files on client cache which have been recently backed up and use this cache expressly for the purpose of reducing transmission cost of subsequent backups. Further note that this cache has also other uses. For example, if a file is accidentally deleted it may be restored immediately from the cache.

It should also be noted that at most one copy of any file is ever stored in this cache. The question arises as to which files should be saved in this cache, for example if it is known that files will be repeatedly backed up they are good candidates. Since the cache is also of finite size, there is also the question of which file is deleted (or "replaced") when space is needed in this cache. The Least Recently Used (LRU) rule may be used to decide which file should be deleted.

It is recommended that this cache represent a storage space equal to 1% to 5% of the storage available on the client 21 in order for this cache to result in a large decrease in network bandwidth. Furthermore, the files stored in the cache can be stored compressed for an additional space saving.

An alternative to the use of a cache, is to transmit the compressed file F from the server 25 to the client 21 and perform the differencing against the received file at the client 21. This alternative is very attractive in at least two situations: (1) when processing resource at the server is scarce and client processing resource is idle and (2) in communication situations with asymmetric bandwidth such as in mobile computing.

In another alternative embodiment, a method and system is utilized for computing a delta at the client 21, transmitting it to the server 25, and partial decompression of the segmented compressed file at the server 25, thereby avoiding the decompression of an entire (non-segmented) compressed file at the server 25. Note that in the application of a delta file at the server 25, the corresponding uncompressed file is not being read in its entirety as in the preferred embodiment, so it is not known to which segment or segments of the compressed file F the delta should be applied. This problem can be solved by augmenting the segmented file F by a file known as sidefile as described above. The sidefile contains offsets which describes the line number (or offset in a binary application) in the corresponding uncompressed file corresponding to the beginning of each segment. Having these offsets at hand, it will be clear to a person skilled in the art how the roll forward operation of file F is carried out.

APPENDIX A

"Pseudo code for the diff(,,) operation"

The methods described in this invention make use of a differencing function which is known in the art of Source Code Control Systems. The methods described in this invention assume that it can be detected whether the differencing method is "in synch", i.e., in the state of detecting differences when it returns control to the calling function. While it should be clear to a person skilled in the art how a standard differencing program would be modified in order to achieve this effect, for completeness we will explicitly describe a simple version of a complete algorithm which accomplishes this purpose.

Figure 4:
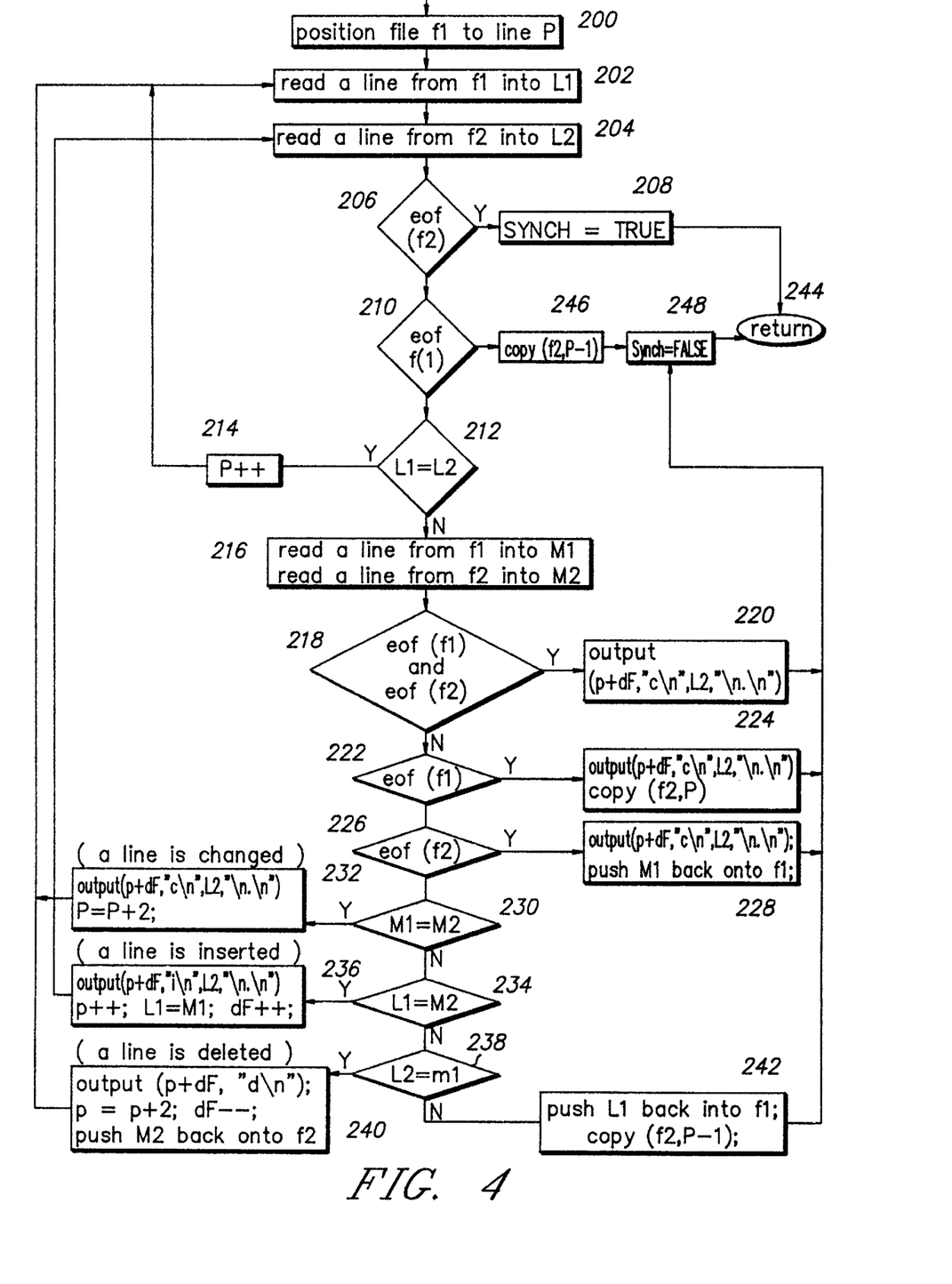
FIG. 4 is a flow chart illustrating implementation of diff(,,) operation.

FIG. 4 depicts a flow chart for a program diff(,,) which is suitable for use by the preferred embodiment and alternative embodiments presented in this application. Common C language convention is assumed (see D. W. Kernighan, D. M. Ritchie, The C Programming Language, Prentice Hall, 1978). In the program described here, diff(p, f1, f2) takes three arguments p, f1, f2, where p is the line number corresponding to the first line in file f1, and f1 and f2 are the files to be differenced. The program also makes use of a function eof(f).

After reading a line from file f, eof(f) determines whether the end of file condition was encountered (i.e., no line was found). \n denotes a newline character, p++ denotes increment p, and p-- denotes decrement p. We also assume that pushing back onto a file is allowed (see Kernighan and Ritchie) and make use of two functions copy(f,p) and del(f,p) described by the following pseudo code:

```
copy(f,p) {
    do{
        read a line of f into string buffer L;
        if eof(f) return else output (p+dF, "a\n", L, "\n. \n");
        dF++;p++;}
    }
del(f,p) {
    do{
        read a line of f into string buffer L;
        if eof(f) return else output(p+dF, "d\n");
        dF--;p++;}
    }
```

The output of diff(,,) is in the input format for the standard UNIX line editor ed. Thus, for example, the output

```
17c
a changed line
.
``` would signal ed, the line editor, to change line 17 to "a changed line",

28d would signal ed to delete line 28,

```
38a
a new line
.
``` would cause ed to add "a new line" after line 38, and

```
38i
a new line
.
``` would cause ed to add "a new line" before line 38.

We can now provide illustrative pseudo code and a flow chart for diff(p, f1, f2):
position file f1 to line p;
A: read a line from f1 into L1; (L1 is a storage buffer)
B: read a line from f2 into L2; (L2 is a storage buffer)
if eof(f2) {SYNCH=TRUE; return;}
if eof(f1) {copy(f2, p-1); SYNCH=FALSE; return;}
if L1=L2 {p++; goto A}
read a line from f1 into M1; (M1 is a storage buffer)
read a line from f2 into M2; (M2 is a storage buffer)
if eof(f1) and eof(f2){output(p+dF, "c\n", L2, "\n.\n"); SYNCH=FALSE; return;}
if eof(f1) {output(p+dF, "c\n", L2, "\n.\n"); copy(f2, p); SYNCH=FALSE; return;}
if eof(f2) {output(p+dF, "c\n", L2, "\n.\n"); push M1 back onto f1; SYNCH=FALSE; return;}
if M1=M2 output(p+dF, "c\n", L2, "\n.\n"); p=p+2; goto A) /* a line changed */
if L1=M2 output(p+dF, "a\n", L2, "\n.\n"); p++; L1=M1;dF++;goto B) /* a line added */
if L2=M1 output(p+dF, "d\n"); p=p+2; push M2 back onto f2; dF--;goto A) /* a line deleted */

```
/* a more extensive change has occurred */
push L1 back onto f1;
copy(f2, p-1);
SYNCH=FALSE;
return;
```

The diff (,,) method stated above and shown in FIG. 6 is for illustration purpose only. It would be clear to one skilled in the art that alternative methods of differencing can be written to address situations where changes consist of, for example, multiple contiguous lines, while maintaining the variable SYNCH as shown above. Such an alternative method is described in the IBM AIX Version 3.2 Command Reference mentioned above.

A number of embodiments of the present invention have been described. Nevertheless, it will be understood that various modifications may be made without departing from the spirit and the scope of the invention. Accordingly, it is to be understood that the invention is not to be limited by the specific illustrated embodiments, but only by the scope of the appended claims.

I claim:

1. A method for storing information in a client-server environment having a client and a backup subsystem, the backup subsystem comprising a backup server, a server backup program, a storage medium, and a copy of a versioned sequence of a file stored in the storage medium, said versioned sequence comprising a base version of a file in multiple compressed segments and a predetermined number of delta files, the client having a client backup program and a storage medium, the client and the backup server are connected to each other by a communication link, comprising the steps of:

establishing a backup session between the client and the backup server;

detecting, using the client backup program, a changed version of said file at the client;

transmitting said changed version of said file, using the communication link, from the client to the backup subsystem; and differencing, using the backup subsystem, the changed version of said file and the base version of said file to create a delta file.

2. A method as recited in claim 1 further including the step of:

consulting a backup catalog at the backup subsystem to locate the versioned sequence of said file before differencing.

3. A method as recited in claim 2 further including the steps of:

deleting the base version of said file in the backup subsystem after differencing;

storing said delta file in the storage medium of the backup subsystem; and storing the changed version of said file as the new base version of said file on the storage medium of the backup subsystem.

4. A method as recited in claim 3 further including the step of deleting the oldest delta file in said versioned sequence of said file after storing the new base version of said file in the backup subsystem.

5. A method as recited in claim 3 wherein the changed version of said file is stored in a form of a multiple compressed segments.

6. A method as recited in claim 1 wherein the step of establishing a backup session comprises the steps of:

transmitting a query, using the communication link, to the client by the backup subsystem; and receiving a backup session established signal, using the communication link, from the client by the backup subsystem.

7. A method as recited in claim 1 wherein said communication link is a transmission line.

8. A method as recited in claim 1 wherein said backup server is a personal computer.

9. A method as recited in claim 1 wherein said backup server is a workstation.

10. A method as recited in claim 1 wherein said backup subsystem storage medium comprises a magnetic storage device.

11. A method as recited in claim 1 wherein said backup subsystem storage medium comprises an optical storage device.

12. A method as recited in claim 1 wherein said backup subsystem storage medium comprises a tape storage device.

13. A method as recited in claim 1 wherein the step of transmitting a changed version of said file further includes transmitting the changed version of said file in an uncompressed format.

14. A method as recited in claim 13 wherein the step of differencing, using the backup subsystem, is further carried out using the multiple compressed segments of the base version of said file and the changed version of said file.

15. A method as recited in claim 1 wherein the step of transmitting the changed version of said file comprises the step of transmitting the multiple compressed segments of the changed version of said file one compressed segment at a time.

16. A method as recited in claim 15 further including the steps of:

transmitting, using said communication link, a side file to the client from the backup subsystem; and utilizing, using client computer, said side file for compressing the changed version of said file into multiple compressed segments.

17. A method for storing and transmitting information in a client-server environment having a client and a backup subsystem, the backup subsystem comprising a backup server, a server backup program, a storage medium, and a copy of a versioned sequence of a file stored in the storage medium, said versioned sequence comprising a base version of a file in multiple compressed segments and a predetermined number of delta files, the client and the server are in communication with each other by a communication link, comprising the steps of:

establishing a backup session between the client and the backup subsystem;

detecting a changed version of said file at the client;

differencing, using the client, the changed version of said file and the base version of said file at the client to create a delta file;

transmitting said delta file, using the communication link, to the backup subsystem; and storing said delta file in the backup subsystem.

18. A method as recited in claim 17 further including the steps of:

generating the changed version of said file at the backup subsystem using said delta file and the base version of said file; and storing the changed version of said file as the new base version of said file in the backup subsystem.

19. A method as recited in claim 18 further including the step of deleting the base version of said file at the backup subsystem after generating the changed version of said file at the backup subsystem.

20. A method as recited in claim 17 wherein the step of differencing at the client further includes the steps of:
- checking the storage medium at the client to determine if a copy of the base version of said file is available in the client storage medium;
- requesting a copy of the base version of said file from the backup subsystem if a copy of the base version of said file is not available in the client storage medium; and
- receiving a copy of the base version of said file from the backup subsystem if a copy of the base version of said file is not available in the client storage medium.

21. A method as recited in claim 20 wherein the client storage medium is a cache.

22. A method as recited in claim 20 where a copy of the base version of said file is stored at the client storage medium in a multiple compressed segments.

23. A method as recited in claim 17 wherein the step of differencing, using the client, is further carried out using the multiple compressed segments of the base version of said file and the changed version of said file.

24. A method as recited in claim 17 wherein said communication link is a transmission line.

25. A method as recited in claim 17 wherein said backup server is a personal computer.

26. A method as recited in claim 17 wherein said backup server is a workstation.

27. A method as recited in claim 17 wherein said backup subsystem storage medium comprises a magnetic storage device.

28. A method as recited in claim 17 wherein said backup subsystem storage medium comprises an optical storage device.

29. A method as recited in claim 17 wherein said backup subsystem storage medium comprises a tape storage device.

30. In a client-server environment having a client and a backup subsystem, the backup subsystem comprising a backup server and a backup storage medium, and where the client comprises a client storage medium, the client and the backup server connected to each other by a communication link, a method for storing and transmitting information in said client-server environment, comprising the steps of:
- storing a versioned sequence of a file, using the backup storage medium, in the backup subsystem, said versioned sequence comprising a base version of a file in multiple compressed segments and a predetermined number of delta files;
- detecting a changed version of said file at the client;
- differencing, using the client, the changed version of the said file and the base version of said file to create a delta file at the client;
- transmitting, using the communication link, said delta file to the server; and
- storing said delta file in the backup subsystem.

31. A method as recited in claim 30 further including the steps of:
- creating a changed version of said file at the backup subsystem using said delta file and the base version of said file;
- storing the changed version of said file at the backup subsystem; and
- deleting the base version of said file from the backup subsystem.

32. A method as recited in claim 31 wherein the step of storing the changed version of said file includes storing multiple compressed segments of said file.

33. A method as recited in claim 30 wherein the step of differencing, using the client, is carried out using the multiple compressed segments of the base version of said file and the changed version of said file.

34. A method as recited in claim 30 further including the step of storing the copy of the base version of said file in the client storage medium according to an established qualification criteria.

35. A method as recited in claim 30 further including the step of storing the changed version of the file in the client at the completion of comparing the changed version of said file and the base version of said file.

36. A method as recited in claim 30 further including the step of updating the base version of said file at a predetermined time.

37. In a client-server environment having a client and a backup subsystem, the backup subsystem comprising a backup server and a storage medium, the client is connected to the backup server by a communication link, the backup subsystem including a copy of a versioned sequence of a file, said versioned sequence comprising a base file in a multiple compressed segments and a predetermined number of delta files, said client-server environment comprising:
- means for establishing a backup session between the client and the backup server;
- means for transmitting a changed version of said file, from the client to the backup subsystem;
- means for differencing, the changed version of said file and the base version of said file to create a delta file; and
- means for storing said delta file in the backup subsystem.

38. A system as recited in claim 37, further comprising:
- means for deleting the base version of said file in the backup subsystem after differencing; and
- means for storing the changed version of said file as the new base version of said file on the storage medium of the backup subsystem.

39. In a client-server environment having a client and a backup subsystem, the backup subsystem comprising a backup server and a storage medium, and where the client comprises a client storage medium, the client and the server connected to each other by a communication link, said client-server environment comprising:
- means for storing a versioned sequence of a file in the backup subsystem, said versioned sequence comprising a base version of a file in a multiple compressed segments and a predetermined number of delta files;
- means for storing a copy of the base version of said file in the client;
- means for detecting a changed version of said file at the client;
- means for differencing the changed version of said file and the base version of said file to create a delta file at the client;
- means for transmitting the delta file to the backup subsystem; and
- means for storing said delta file in the backup subsystem so the base version of said file can be updated at a predetermined time.

40. A system as defined in claim 39 further comprising:
- means for creating a changed version of said file at the backup subsystem using said delta file and the base version of said file;
- means for storing the changed version of said file at the backup server; and means for deleting the base version of said file at the backup server.

41. A system as defined in claim 39 wherein the means for differencing the base version of said file with the changed version of said file comprises the means for differencing the multiple compressed segments of the base version of said file and the changed version of said file.

42. A method for storing information in a client-server environment having a client and a backup subsystem, the backup subsystem comprising a backup server and a copy of a versioned sequence of a file, said versioned sequence comprising a base version of said file in multiple compressed segments and a predetermined number of delta files, the client and the backup server are in communication with each other, comprising the steps of:

detecting, using the client, a changed version of said file at the client;

transmitting said changed version of said file from the client to the backup subsystem; and differencing, using the backup subsystem, the changed version of said file and the base version of said file to create a delta file.

* * * * *